United States Patent
Oka et al.

(10) Patent No.: US 7,656,483 B2
(45) Date of Patent: Feb. 2, 2010

(54) LIQUID CRYSTAL DISPLAY

(75) Inventors: Shinichiro Oka, Hitachi (JP); Osamu Itou, Hitachi (JP); Shoichi Hirota, Hitachi (JP)

(73) Assignee: Hitachi Displays, Ltd., Chiba (JP)

( * ) Notice: Subject to any disclaimer, the term of this patent is extended or adjusted under 35 U.S.C. 154(b) by 94 days.

(21) Appl. No.: 11/836,889

(22) Filed: Aug. 10, 2007

(65) Prior Publication Data
US 2008/0079876 A1   Apr. 3, 2008

(30) Foreign Application Priority Data
Sep. 29, 2006   (JP)  .............................. 2006-266248

(51) Int. Cl.
*G02F 1/1335* (2006.01)
(52) U.S. Cl. ....................... 349/114; 349/117
(58) Field of Classification Search ................. 349/114, 349/113, 117
See application file for complete search history.

(56) References Cited

U.S. PATENT DOCUMENTS

| | | | |
|---|---|---|---|
| 6,341,002 | B1 | 1/2002 | Shimizu et al. |
| 2004/0070714 | A1 | 4/2004 | Ishii et al. |
| 2006/0158586 | A1 | 7/2006 | Bruinink et al. |

FOREIGN PATENT DOCUMENTS

| | | |
|---|---|---|
| CN | 1480774 | 3/2004 |
| CN | 1609671 | 4/2005 |
| CN | 1802597 | 7/2006 |
| JP | 2000-187220 | 7/2000 |
| JP | 2003-279956 | 10/2003 |
| JP | 2003-322857 | 11/2003 |
| JP | 2004-4494 | 1/2004 |
| JP | 2006-292847 | 10/2006 |
| JP | 2007-206457 | 8/2007 |
| WO | WO 2006/050793 | 5/2006 |

*Primary Examiner*—David Nelms
*Assistant Examiner*—David Y Chung
(74) *Attorney, Agent, or Firm*—Antonelli, Terry, Stout & Kraus, LLP.

(57) ABSTRACT

A transreflective or "semi-transmissive" liquid crystal display (LCD) device of the vertical alignment (VA) type is disclosed. The VA-LCD device includes a pair of spaced-apart substrates with a layer of liquid crystal (LC) material sandwiched therebetween. The LCD device also includes a polarization plate provided on one of the substrates, another polarization plate on the other substrate, and a matrix of rows and columns of pixels formed between the substrates. Each pixel has a reflection part and a transmission part. The LC layer is variable in thickness so that its portion at the transmission part is thicker than a portion at the reflection part. At the reflection part, an internal retardation plate having an optical phase difference is disposed between the LC layer and its associated substrate. This plate forms an angle of about 45 degrees with the absorption axis of each polarization plate.

20 Claims, 10 Drawing Sheets

TFT SUBSTRATE         CF SUBSTRATE

T: TRANSMISSION AREA
R: REFLECTION AREA

TFT SUBSTRATE

CF SUBSTRATE

T: TRANSMISSION AREA
R: REFLECTION AREA

A-A' CROSS SECTIONAL VIEW

B-B' CROSS SECTIONAL VIEW a: LONG AXIS DIRECTION OF ORIENTATION CONTROL PROJECTION 29
b: ABSORPTION AXIS OF POLARIZER PLATE 32a
c: ABSORPTION AXIS OF POLARIZER PLATE 32b

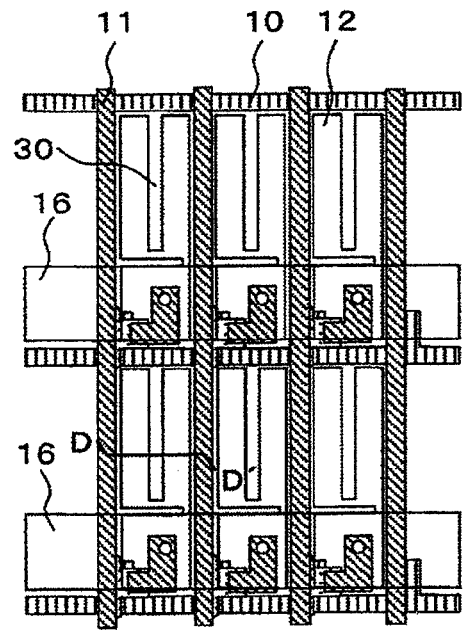
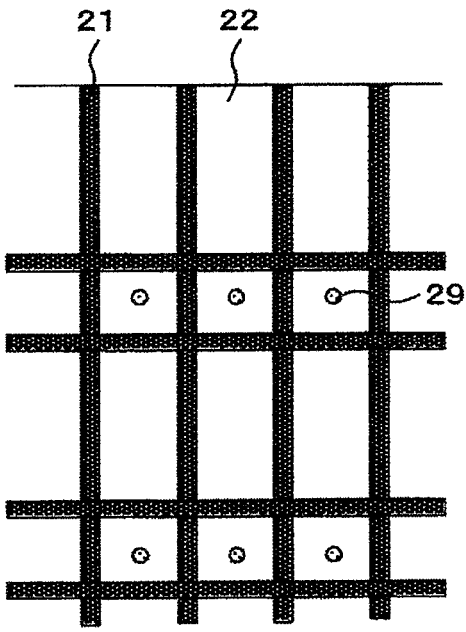
FIG.7A TFT SUBSTRATE
FIG.7B CF SUBSTRATE
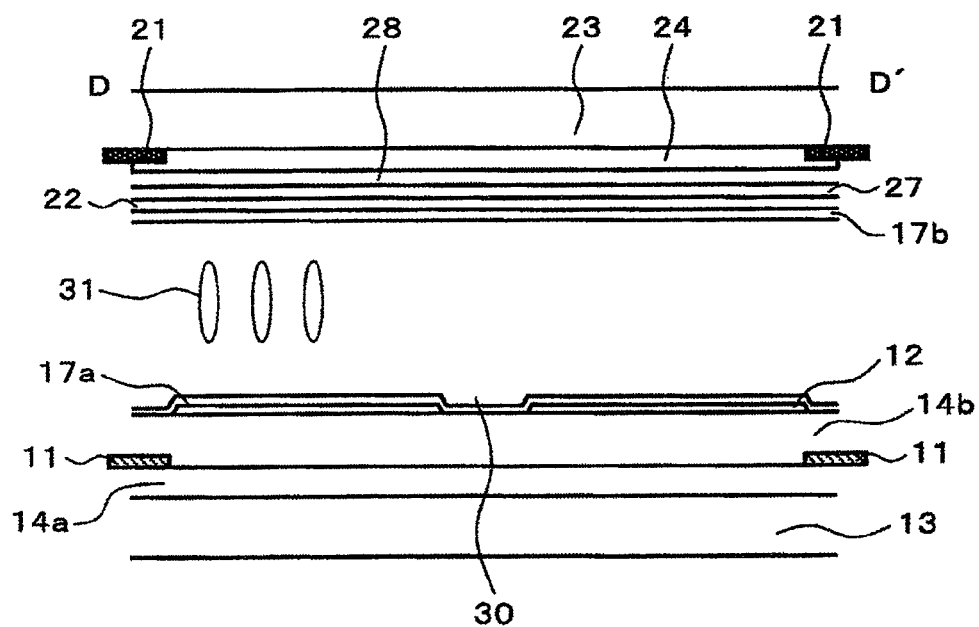
FIG.8

TFT SUBSTRATE

CF SUBSTRATE

TFT SUBSTRATE

CF SUBSTRATE

TFT SUBSTRATE

CF SUBSTRATE

TFT SUBSTRATE

CF SUBSTRATE

TFT SUBSTRATE

CF SUBSTRATE

TFT SUBSTRATE

CF SUBSTRATE

TFT SUBSTRATE

CF SUBSTRATE

TFT SUBSTRATE

CF SUBSTRATE

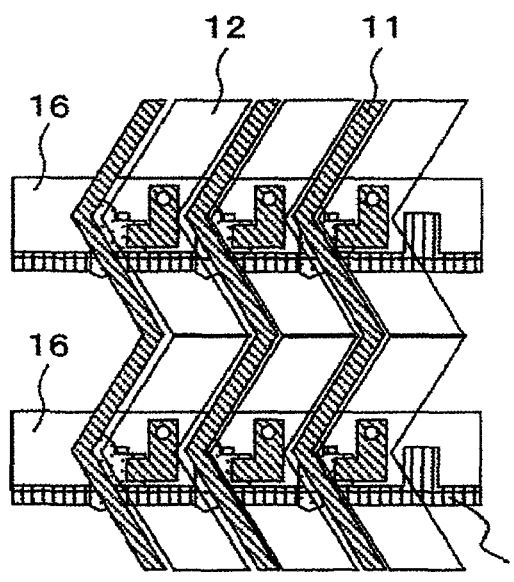
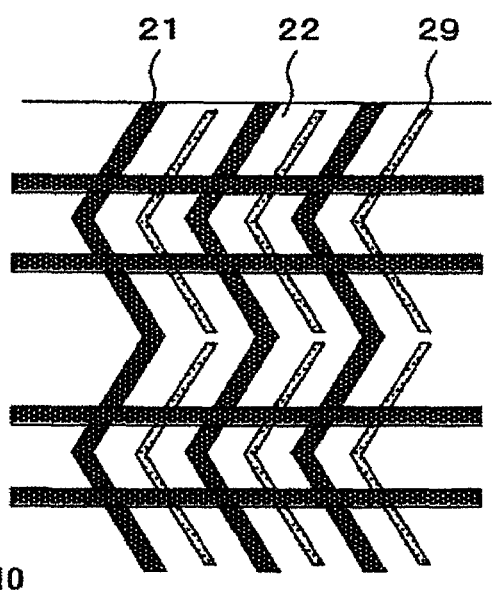
FIG.17A
FIG.17B

LIQUID CRYSTAL DISPLAY

BACKGROUND OF THE INVENTION

The present invention relates generally to liquid crystal display (LCD) devices and, more particularly, to transreflective LCD devices, also known as "semi-transmissive" LCDs.

LCD devices are nonluminous display panels which visually display on-screen images by adjustment of amounts of transmitted light rays, unlike self-luminous display devices, such as cathode ray tube (CRT) monitors and plasma display panels (PDPs). LCD panels have advantageous features, such as slimness, light weight, and low power consumption.

LCD devices typically include transmissive LCD panels and reflective LCD panels, wherein the former displays images through adjustment of the amount of transmission light emitted from a light source on a back plane, called the back-light, whereas the latter displays images by adjustment of the amount of reflection rays of the incoming outside light, e.g., room illumination light, sunlight, etc., while letting the light reflect from a front surface side. Recently, a hybrid type of LCD device is known, called the transreflective or "semi-transmissive" LCD panel. This type of LCD panel has image display functionalities of both the transmissive and the reflective LCDs-that is, it is usable as a reflective LCD in bright environments and is operable as a transmissive LCD in dark environments. Letting its backlight turn off in bright environments contributes to a decrease in power consumption. Turning the backlight on in dark environments provides users with enhanced viewability. The transreflective LCD panel is preferably adaptable for use in portable or handheld electronics tools, such as mobile cellular phones, digital cameras or the like, which are expected to be used under various kinds of illumination conditions.

In currently available transreflective LCD panels, there are several display technologies, such as electrically controlled birefringence (ECB) technique with the initial orientation of liquid crystal (LC) material being almost in parallel with a substrate surface, twisted nematic (TN) technique, and vertical alignment (VA) scheme with LC material being oriented in a direction substantially perpendicular to the substrate surface. In the case of VA display, a phase difference in the direction at right angles to the substrate surface becomes nearly zero in the initial orientation state because of the fact that LC material is oriented vertically to the substrate. Thus, an increased gap margin is attainable while at the same time enhancing reflection contrast ratios.

JP-A-2000-187220 discloses therein optical designs of a transreflective VA-LCD panel. This Japanese patent bulletin teaches an approach to optimally designing the retardation of each of reflection and transmission regions. To do this, a step-like surface difference is provided at the reflection region to cause LC layer to be variable in thickness so that the thickness of a layer portion at the reflection region is almost one-half of the thickness of an LC layer portion at the transmission region. In addition, in order to make the transmission and reflection areas equal to each other in optical characteristics, a quarter wavelength ($\lambda/4$) plate is disposed outside of a respective one of the upper and lower panel substrates. This $\lambda/4$ plate is laid out to cover both the transmission and reflection regions.

Unfortunately, suggested advantages of the LCD panel structure as taught from JP-A-2000-187220 do not come without accompanying a penalty which follows. The LC layer experiences unwanted entry of circularly polarized light due to the presence of the $\lambda/4$ plates disposed external to the upper and lower substrates. This poses a problem as to a decrease in transmission contrast ratio due to occurrence of light leakage during black displaying in cases where there are deviations of the optical axes of $\lambda/4$ plates and/or variations of in-plane phase difference.

SUMMARY OF THE INVENTION

This invention has been made in order to avoid the problem faced with the prior art, and an object of the invention is to provide a transreflective vertical alignment (VA) type LCD device capable of achieving improved transmission contrast ratios.

To attain the foregoing object, this invention provides an LCD device which includes a pair of spaced-part first and second substrates, a layer of liquid crystal (LC) material interposed between the first and second substrates, a first polarization plate provided at the first substrate, and a second polarization plate provided at the second substrate. The first and second polarization plates have their absorption axes which are disposed to cross together at substantially right angles to each other. Upon application of no voltage, the LC layer exhibits orientation so that long axes of liquid crystal molecules are substantially perpendicular to the first and second substrates. A plurality of picture elements or "pixels" are formed between the first and second substrates. Each pixel has a reflection part and a transmission part. The LC layer is variable in thickness so that a layer portion being disposed at the transmission part is thicker than a layer portion disposed at the reflection part. At the reflection part, an internally built-in retardation plate having an optical phase difference is disposed between the second substrate and the LC layer. The internal retardation plate has its phase delay axis forming an angle of substantially forty five (45) degrees with each of the absorption axes of the first and second polarization plates.

Note here that the term "substantially perpendicular" is intended to mean that the angle of two axes crossing together falls within a range of from 88 to 92 degrees. Regarding the term "about 45 degrees" means that the crossing angle of two axes falls within a range of 43 to 47 degrees. The term "almost parallel" to be later used in the description means that the crossing angle of two axes is within a range of –2 to 2 degrees.

Additional features of this invention are as follows. The internal retardation plate has a retardation of quarter (¼) wavelength. The first substrate has a pixel electrode on the LC layer side and has the first polarization plate on the opposite side to the LC layer. The second substrate has a common electrode on the liquid crystal layer side and the second polarization plate on the opposite side to the LC layer. The internal retardation plate is disposed between the second substrate and the common electrode. The LC layer's molecules are negative in anisotropy of dielectric constant.

In addition, in the LCD device of the invention, a mechanism for controlling orientation of the LC layer at the transmission part is different from a mechanism for controlling orientation of the LC crystal layer at the reflection part. The mechanism for control of orientation of the LC layer at the transmission part is either a first projection or an electrode slit. The first projection or the electrode slit has its long axis extending to form an angle of about 45 degrees with each of the absorption axes of the first and second polarization plates. The mechanism for controlling orientation of the LC layer at the reflection part is either a second projection or an electrode opening, which is substantially circular in shape. A convexo-concave configuration is disposed at the reflection part on the LC layer side of the first substrate. The mechanism for controlling orientation of the reflection part is done by the convexo-concave configuration. The LC layer is arranged so that a division number of orientation control at the transmission part is different from a division number of orientation control at the reflection part. The division number of orientation control at the transmission part is either two (2) or four (4), which is different from the division number of orientation control at the reflection part. The orientation direction of LC molecules upon voltage application in the LC layer is at an angle of about forty five (45) degrees with each of the absorption axes of the first and second polarization plates at the transmission part; at the reflection part, the orientation direction includes angles other than about 45 degrees. The transmission part is formed to be divided into a first transmission part and a second transmission part with the reflection part being placed therebetween. The first transmission part and at the second transmission part are different from each other in orientation direction of LC molecules upon voltage application in the LC layer. The transmission part and the reflection part are each arranged to have either a projection or an electrode slit for orientation control. Any one of the projection and the electrode slit has a bent portion, which is disposed either at the reflection part or between adjacent pixels. Each pixel has a folded shape.

Additionally, the LCD device may further include one or both of a first retardation plate between the first substrate and the first polarization plate and a second retardation plate between the second substrate and the second polarization plate. The first retardation plate has its phase delay axis, also known as "slow" axis, which is disposed substantially perpendicular to or in parallel with the absorption axis of the first polarization plate. The second retardation plate has its slow axis which is disposed substantially perpendicular to or in parallel with the absorption axis of the second polarization plate. The first and second retardation plates are each structured from a negative C-plate. This negative C-plate is more than or equal to 50 nanometers (nm) and yet less than 150 nm in Rth, where Rth is out-of-plane retardation. Alternatively, these retardation plates are each made up of a negative C-plate and a biaxial retardation film. In this case the negative C-plate is more than or equal to 50 nm and yet less than 150 nm in Rth. The biaxial retardation film is more than or equal to 0.2 and less than 0.8 in Nz coefficient thereof.

Using the structural features of this invention makes it possible to realize the intended transreflective or semi-transmissive VA-LCD device with increased transmission contrast ratios.

Other objects, features and advantages of the invention will become apparent from the following description of the embodiments of the invention taken in conjunction with the accompanying drawings.

BRIEF DESCRIPTION OF THE DRAWINGS

FIGS. 7A and 7B are diagrams each showing a planar structure of an LCD cell array also embodying the invention.

FIG. 8 is a sectional view of the LCD cell structure taken along lines D-D' of FIG. 7A.

FIGS. 17A-17B are diagrams each showing a planar structure of an LCD cell array in accordance with another further embodiment of the invention.

DETAILED DESCRIPTION OF THE INVENTION

Currently preferred forms of this invention will be described below.

Embodiment 1

A transreflective or "semi-transmissive" liquid crystal display (LCD) device of the vertical alignment (VA) type in accordance with one embodiment of the invention is arranged so that an internally built-in retardation plate is disposed only at a reflective region of each cell.

The VA technique refers to the one that permits liquid crystal (LC) molecules to be oriented or aligned in a direction perpendicular to a substrate surface upon application of a voltage and behave to rotate in the horizontal direction in parallel with the substrate surface when a suitable voltage is applied thereto. The internal built-in retardation plate is a phase-difference plate that is disposed inside of a cell, rather than outside of upper and lower panel substrates. A detailed explanation will be given of a structure of the VA transreflective LCD device embodying the invention along with its respective parts or components, while referring to FIGS. 1A-1B, 2A-2B and 3 to 5.

Figure 3:
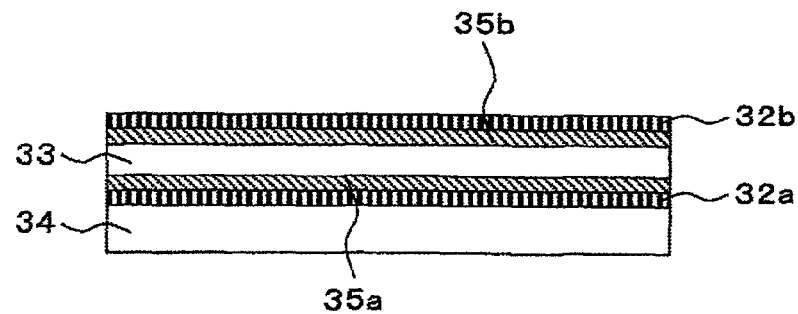
FIG. 3 is a diagram schematically depicting a sectional view of the LCD panel embodying the invention.

FIG. 3 shows schematically a sectional view of the embodiment LCD device. This LCD device includes a pair of polarization plates 32a and 32b, a pair of retardation plates 35a-35b, an array of LC cells 33, i.e., picture elements or "pixels," which are disposed therebetween, and a back-light unit 34.

The polarizer plates 32a-32b are each constituted from a stretched polyvinylalcohol (PVA) layer with iodine adsorbed therein and a protective film formed thereon. To achieve normally-close, the first and second polarizer plates 32a-32b are disposed so that their absorption axes are substantially perpendicular to each other. It is noted that the retardation plates 35a-35b are disposed in order to suppress or prevent light leakage when observing from oblique directions during black displaying. These plates are not always essential components to the LCD device embodying the invention.

Each retardation plate 35a, 35b is a negative C-plate which has almost isotropy in in-plane direction refractivity and which is less in refractivity in a direction along the thickness when compared to the inplane refractivity. The retardation plates 35a-35b are made of cellulose acylates, such as cellulose acetate, cellulose acetate butyrate, etc., polycarbonate, polyolefin, polystyrene, polyester or other similar suitable materials. Preferably the plates 35a-35b are made of cellulose acylate; more preferably, cellulose acetate. The upper and lower disposed retardation plates 35a-35b are substantially the same as each other in out-of-plane retardation Rth in the thickness direction thereof; desirably, the Rth value is set at 100 nm, or more or less. Rth is defined by Equation (1) below.

[EQU1]

$$Rth = \left(\frac{n_x + n_y}{2} - n_z\right) \cdot d \quad (1)$$

In this equation, $n_x$, $n_y$, $n_z$ are refraction indexes in directions along main axes of a refractivity ellipsoid-more specifically, $n_x$, $n_y$ is the refractivity in inplane direction, and n, is the refractivity in the thickness direction. In addition, d is the thickness of a retardation plate (here, negative C-plate).

In the case of optical compensation being performed, the retardation plates 35a-35b may be designed so that each uses the negative C-plate in combination with a two-axis or biaxial retardation film. Desirably, the biaxial retardation film is disposed between the retardation plate 32a, 32b and the negative C-plate while at the same time causing the biaxial film's phase delay axis, also called the "slow" axis, to be identical to the absorption axis of polarizer plate. Also desirably the biaxial retardation film's Nz coefficient indicative of three-dimensional refractive index is set to 0.5 with respect to both the backlight side and light output side. The Nz coefficient is defined by Equation (2) presented below.

[EQU2]

$$Nz = \frac{n_x - n_z}{n_x - n_y} \quad (2)$$

The back-light unit 34 is structured from a light-emitting diode (LED) serving as a light source, a light guide plate, a diffuser plate and others. Preferably the LED is of white light type, although LEDs of three primary colors, i.e., red (R), green (G) and blue (B), are alternatively employable when the need arises. A typical example of the backlight unit 34 is the one capable of illuminating the array of LC cells 33 from its back side, although the light source and structure are not exclusively limited thereto. As an example, the advantages of this invention are also obtainable when using a cold-cathode fluorescent lamp (CCFL) as the light source.

Figure 1A:
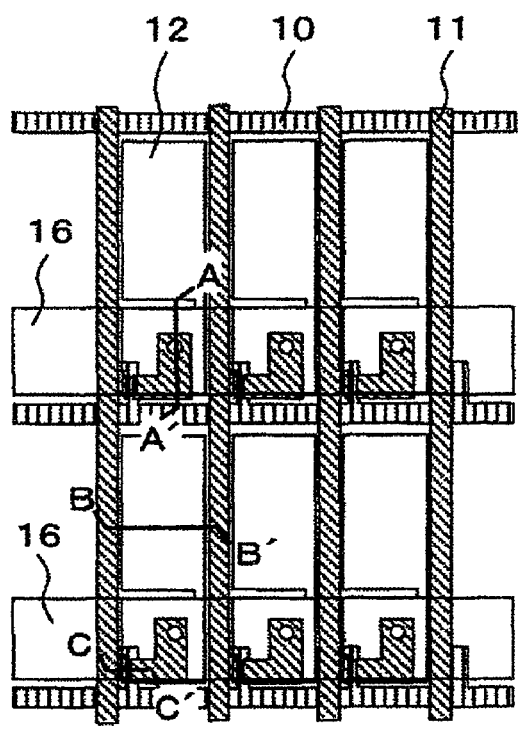
FIGS. 1A and 1B are diagrams each showing a planar structure of a cell array of a liquid crystal display (LCD) panel in accordance with one embodiment of this invention.
Figure 1B:
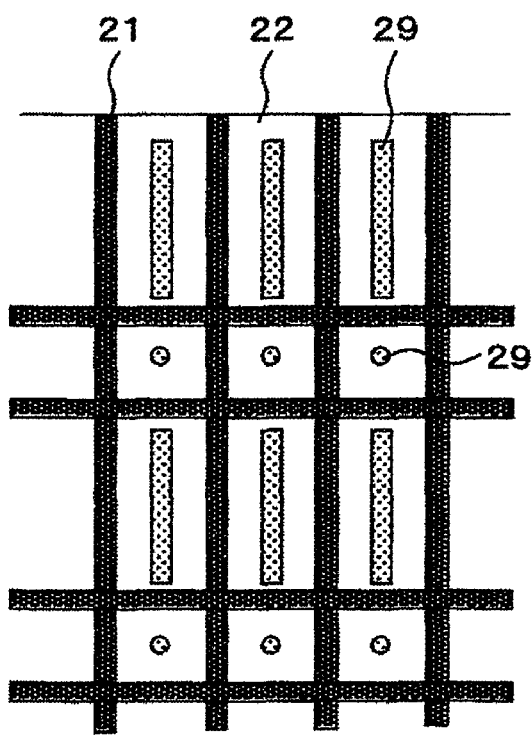

FIGS. 1A-1B are diagrams each showing schematically a planar structure of the array of LC cells 33 in FIG. 3. FIG. 1A depicts a plan view of thin-film transistor (TFT) substrate side whereas FIG. 1B shows that of color filter (CF) side.

On the TFT substrate shown in FIG. 1A, respective pixels are formed by a plurality of scanning lines 10 and a plurality of signal transfer lines 11 disposed to cross or "intersect" the scan lines 10 at right angles. Each pixel has a transmission region T and a reflection region R. In the reflection region R, a reflector plate electrode 16 is disposed; in the transmission region T, a pixel electrode 12 is laid out. On the CF substrate of FIG. 1B, a common electrode 22 and black matrix 21 are formed. As for the structure of projections 29 to be formed in the reflection and transmission regions, its detailed description will be given later in conjunction with Embodiment 2 because such projections are not essential to this embodiment.

Figure 2A:
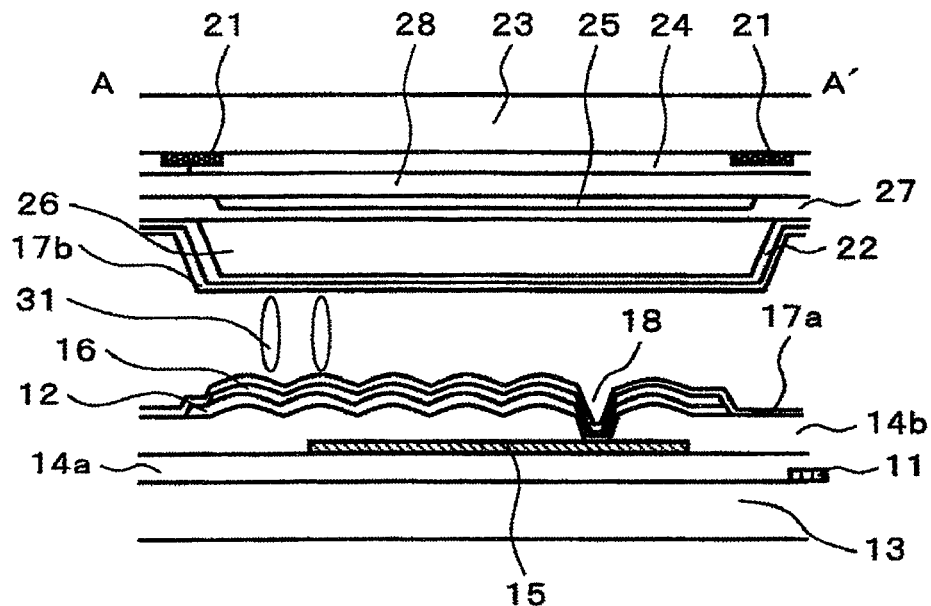
FIGS. 2A and 2B are cross-sectional views of the LCD cell structure taken along lines A-A' and B-B' of FIG. 1A.
Figure 2B:
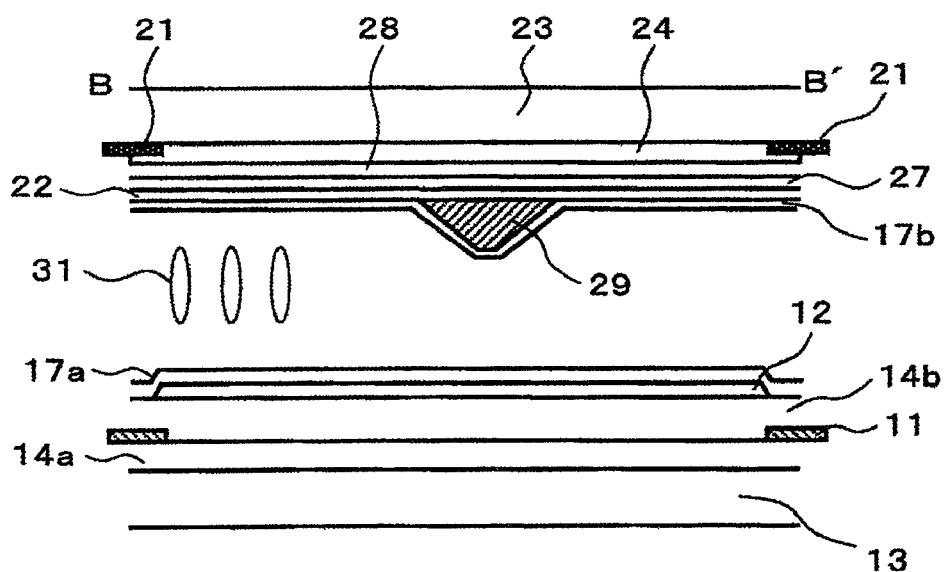

FIGS. 2A-2B show schematically cross-sectional structures of an LC cell 33 in FIG. 3, wherein FIG. 2A is a sectional view of the reflection region R of FIG. 1A as taken along line A-A' whereas FIG. 2B is a sectional view of the transmission region T of FIG. 1A taken along line B-B'.

The LC cell 33 is arranged by an LC layer 31, which is sandwiched between the first substrate 13 and the second substrate 23.

The LC layer 31 is made of a chosen LC material or composition which exhibits negative dielectric anisotropy with the dielectric constant of LC molecules in long axis direction being less than that in short axis direction thereof. An example of the material of LC layer 31 is the one that exhibits nematic phase in a wide temperature range including a room temperature zone while being capable of maintaining sufficient transmissivity within a retention time period under TFT-use drive conditions—e.g., image resolution of quarter video graphics array (QVGA) (320 dots by 240 lines) and drive frequency of 60 Hz—and also having its resistivity high enough to prevent occurrence of flicker noises. Preferably the LC layer 31 is greater than or equal to $10^{12}$ $\Omega$ cm$^2$ in electrical resistivity-more preferably, $10^{13}$ $\Omega$ cm$^2$ or more.

The first substrate 13 is arranged so that a crystal orientation/alignment film 17a is disposed on the top surface at the LC layer side; then, the pixel electrode 12 is disposed. In the transmission region T shown in FIG. 2A, the reflector plate electrode 16 is disposed between the alignment film 17a and the pixel electrode 12. While the reflector electrode 16 may be disposed beneath the pixel electrode 12, the reflectivity becomes higher when disposing the reflector electrode 16 on the LC layer side with respect to the pixel electrode 12. At each pixel, a thin-film transistor (TFT) 19 is disposed in order to control a voltage being applied to each pixel. To make electrical contact between a source electrode 15 of this TFT 19 and the pixel electrode 12, a contact hole 18 is disposed.

The second substrate 23 is such that a color filter 24 is disposed on its LC side with a black matrix 21 being disposed between pixels and between the transmission and reflection regions. On the LC layer side of the color filter 24, a planarization layer 28 and protective layer 27 are disposed; further, a common electrode 22 is disposed on the LC side. Note here that a detailed description of a projection 29 in the transmission region T of FIG. 2B will be given later in Embodiment 2.

In the reflection region R shown in FIG. 2A, an internally built-in retardation plate 25 and a protective film 27 plus a step-like height difference portion 26 are disposed between the planarizer layer 28 and the common electrode 22. An orientation/alignment film 17b is disposed on the LC side of common electrode 22.

The first substrate 13 and second substrate 23 are transparent to permit light to pass therethrough; for example, each substrate is comprised of a glass plate or a polymer film. Preferable examples of the polymer film are plastic material and polyether-sulfone (PES). However, these plastic and PES materials are inherently air-passable, so a need is felt to form a gas barrier on the substrate surface. Desirably this gas barrier is formed of a film of silicon nitride (SiN).

The alignment film 17 functions to force LC molecules at substrate surface to exhibit vertical orientation. Preferably the alignment film 17 is a polyimide-based organic film, although other materials are employable, such as a vertically deposited silicon dioxide ($SiO_2$) film, surface activation agent also known as detergent, or chrome complexes.

An explanation will next be given of the pixel electrode 12 and TFT 19 with reference to FIGS. 4 and 5.

Figure 4:
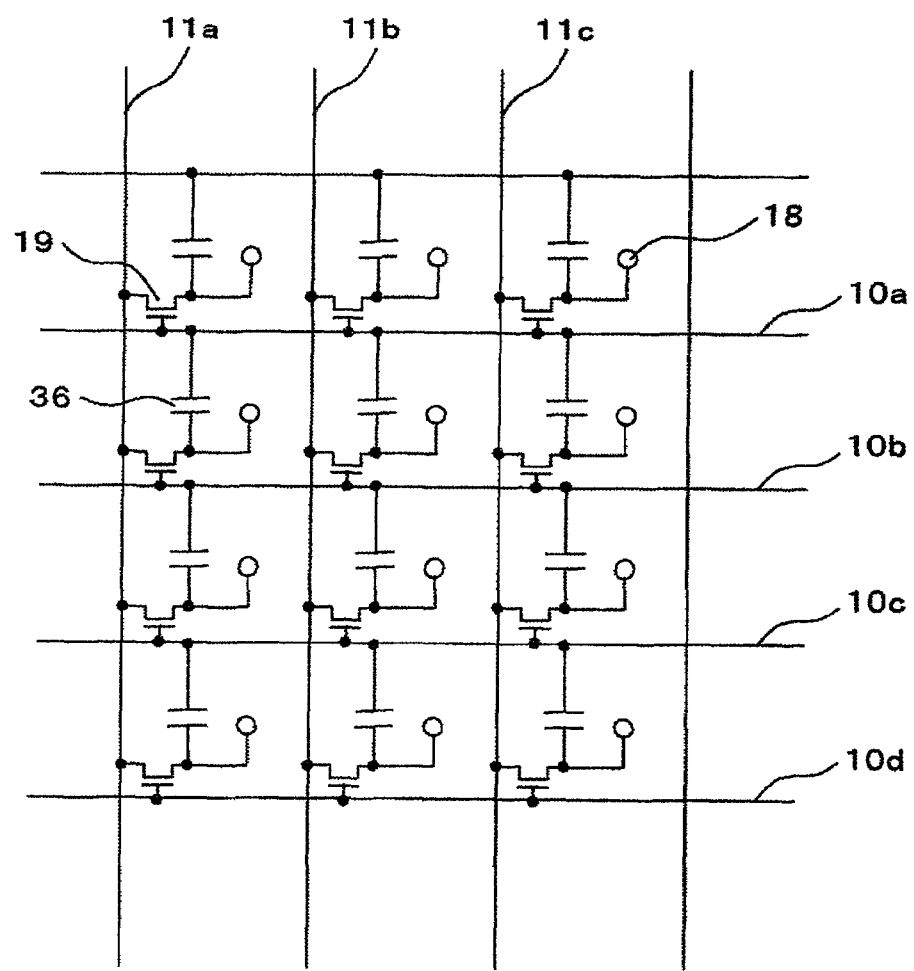
FIG. 4 shows a configuration of equivalent electrical circuitry of a display area of LCD cell of FIGS. 1A-1B.
Figure 5:
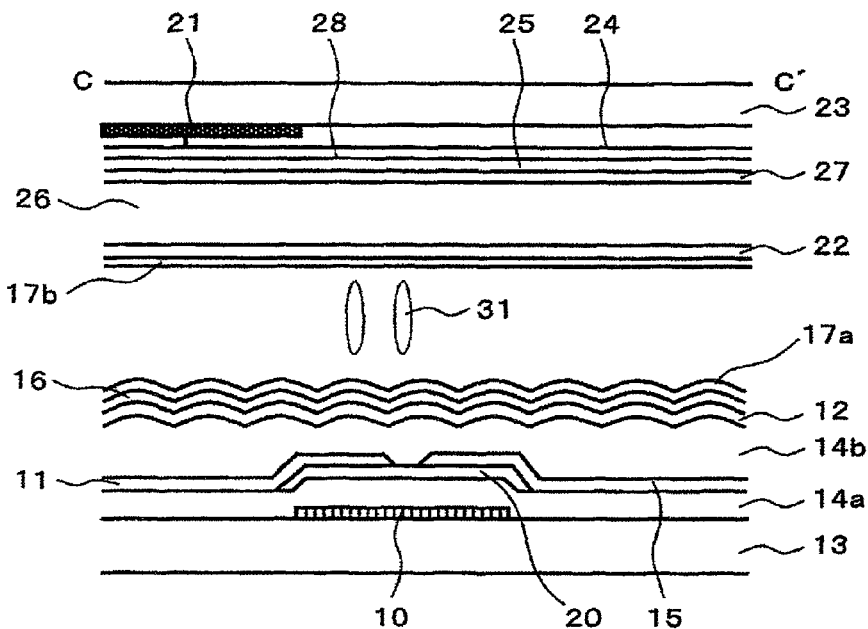
FIG. 5 shows a sectional view of LCD cell taken along line C-C' of FIG. 1A.

FIG. 4 is a diagram showing an electrical equivalent circuit of pixels that are disposed in a matrix form to constitute a screen area. FIG. 5 is a schematic sectional view along line C-C' in FIG. 1A. In a pixel area, a signal transfer line 11 and a scan line 10 are provided. An area surrounded by two adjacent signal lines 11 and neighboring scan lines 10 is a pixel. Such signal lines and scan lines extend to planarly cross together at right angles. At a crossing portion or "intersection," at least one TFT 19 is provided. This TFT 19 is connected to its associated contact hole 18, which in turn is connected to a pixel electrode 12 although not specifically shown in FIG. 4. At least one charge storage capacitor 36 is disposed at one pixel, for preventing unwanted leakage of charge carriers indicative of an image signal being presently stored therein.

Although the explanation here exemplifies the case of active matrix drive using the TFT 19 within one pixel, similar effects are also obtainable when this embodiment is applied to passive matrix drive LCD panels. TFT 19 is of an inversely staggered structure and has a storage capacitor 36 at its channel.

The signal line 11 is applied a voltage signal for control of the LC layer 31; the scan line 10 is applied a signal for control of TFT 19. The source electrode 15 is connected via contact hole 18 to pixel electrode 12. These scan/signal lines 10-11 and source electrode 15 may be made of conductive material of low resistance. Examples of such material are chrome, tantalum-molybdenum, tantalum, aluminum, and copper.

The pixel electrode 12 is disposed in order to apply an electric field to the LC layer 31. The pixel electrode 12 is made of transparent conductive material, such as for example indium tin oxide (ITO), zinc oxide (ZnO) or else.

The pixel electrode 12 has a slit which is formed between the transmission part and reflection part in order to separate these parts from each other.

The reflector plate electrode 16 is provided for reflecting outside light entering from the second substrate 23 side. The reflector electrode 16 has a wave-like corrugated concavo-convex surface configuration for diffusion of incoming outside light. In this embodiment, as better shown in FIG. 2A, the surface configuration is formed at a dielectric film 14a, resulting in its overlying reflector electrode 16 having or "acceding" such corrugation, although this corrugation is formed only at the reflector electrode 16. Additionally, the reflector electrode 16 is capable of serving also as the pixel electrode in reflection region in view of the fact that it is connected to the pixel electrode 12 for setup of the same potential level as that of the transmission region. The reflector electrode 16 is made of a high conductivity metal—preferably, silver (Ag) or aluminum (Al), which is high in reflectivity in visible light range and superior in electrical conductivity.

The color filter 24 is the one that has a layout pattern of RGB light penetration segments on a per-pixel basis. Examples of this layout include, but not limited to, stripe layout or delta layout.

The black matrix 21 is disposed in order to block or "shield" light leakage from neighboring pixels and light leakage due to the presence of a tapered portion(s) of the step-like height difference portion 26 being disposed at the reflection part. The black matrix 21 is made of an opaque metallic material. Examples of this metal are chrome, tantalum-molybdenum, tantalum, aluminum, and copper.

The planarizer layer 28 is provided to remove surface irregularities occurrable during fabrication of the color filter, thereby to planarize the top surface. The planarizer layer 28 is preferably made of acrylic resin or else.

The internal built-in retardation plate 25 is disposed in order to cause optical characteristics of reflection display to come closer to optical response of transmission display. The internal retardation plate 25 is made of LC polymer macro-molecules, so it is high in molecule orientation properties when compared to retardation plates that are manufactured by stretching and expansion of an organic polymer film while having its orientation capability which is almost the same as that of the LC layer 31. This design permits the internal retardation plate 25 to be much larger in $\Delta n$ than an externally attached retardation plate and also to become equal to or greater than that of the LC layer 31 through appropriate adjustment of molecule structures and fabrication process conditions on the case-by-case basis. While the layer thickness of such externally attached retardation plate is several tens of micrometer ($\mu m$) which is nearly ten times greater than the LC layer's thickness, using the LC polymer molecules makes it possible to significantly reduce the layer thickness of internal retardation plate 25 to an extent that is less than the step-like surface difference of the reflective display part and transmissive display part. With such an arrangement, any extra planarization is no longer required even when performing patterning of the internal retardation plate 25 in a way pursuant to the reflective display part.

Then, the internal retardation plate 25 is patterned in a way such that it becomes similar in distribution to the reflective display part. More specifically, a photoresist film is deposited on the internal retardation plate 25; then, patterning of the plate is done so that it becomes the same in distribution as the reflective display part. Thereafter, ashing is applied thereto using a plasma of enzyme for removal of selected portions of the internal retardation plate 25 on which the resist is not distributed.

At this time, if the internal retardation plate 25 is made of a material which is more than two times greater in $\Delta n$ than the LC layer, the resulting thickness becomes deficient when letting the retardation of this internal plate 25 be $\lambda/2$, thereby causing a difference of retardation between the reflection part and the transmission part to become less than $\lambda/4$ with the use of the internal retardation plate 25 only. By selective removal of the resist from the top surface of internal retardation plate 25, rather than complete removal thereof, appropriate thickness setting is achievable, which is sufficient to form the intended retardation different of $\lambda/4$ at the reflection and transmission parts.

Preferably the retardation of the internal retardation plate 25 is approximately 135 nm at a wavelength of 550 nm. Also desirably, the slow axis of retardation is about forty five (45) degrees in angle relative to the absorption axis of polarizer plate.

The protective film 27 is disposed in order to prevent squeeze-out of the material of internal retardation plate 25 into the LC layer 31 to thereby protect the LC layer 31. Desirably the protective film 27 is made of acrylic resin material similar to the planarizer layer 28.

The common electrode 22 is made of transparent conductive material, e.g., ITO or ZnO.

The step-like surface difference portion 26 is formed to cause the transmission part to be substantially equal in optical response to the reflection part. Desirably the step-like difference portion 26 is made of resist material.

As apparent from the foregoing description, in this embodiment transreflective VA-LCD panel, patterning is done in such a way as to internally have the λ/4 plate only at the reflection part inside of the individual LC cell. With this arrangement, it is possible to prevent light leakage during black displaying, otherwise occurring due to unwanted incoming radiation of circularly polarized light rays into the LC layer, resulting in optical axis deviation of the λ/4 plate and/or inplane variation of the phase difference. Thus it is possible to attain increased transmission contrast ratios that are higher than the prior art in the stage of optical designs of the transreflective VA-LCD panel. It is also possible to make the LCD panel thinner than prior art panels because of the fact that the retardation plate 25 is internally built in the LC cell.

Embodiment 2

With the above-stated arrangement of Embodiment 1, it is possible to realize improvement of the transmission contrast ratio. On the contrary, it is considered that the transmissivity decreases because of the absence of the λ/4 plate at the transmission part. To avoid this transmissivity reduction, this embodiment is designed to employ, in addition to the arrangement of Embodiment 1, a technique for orientation control of the transmission region to ensure that main direction along which LC molecules of transmission region fall down is substantially at forty five (45) degrees relative to the absorption axis of each of the upper and lower disposed polarizer plates. Further employed in addition to this arrangement is a structure that the orientation control is made different in pattern between the transmission region and the reflection region.

In this embodiment, a projection 29 is provided in the transmission region shown in FIG. 1B or in the transmission region of FIG. 2B. This projection 29 is disposed in order to control the direction of LC molecules attempting to fall down upon application of a voltage thereto. This projection is not to be construed as limiting the invention and may alternatively be replaced by other similar members, such as an electrode slit(s) by way of example. At a peripheral part of the projection 29 for the orientation control use, the orientation direction of LC molecules within the LC layer 31 is tilted with respect to the normal direction to the substrate surface in accordance with the inclination or "slope" of an edge of the projection 29. The orientation control projection 29 is typically made of acrylic resin, which is formable by photoetching processes.

In FIG. 1B, the projection 29 is formed at or near a central portion of the transmission region of each pixel in such a way that it has a long axis extending in almost parallel with the elongate direction of the pixel. As shown in FIG. 2B, this projection 29 is disposed between the common electrode 22 and the alignment film 17b.

Figure 6:
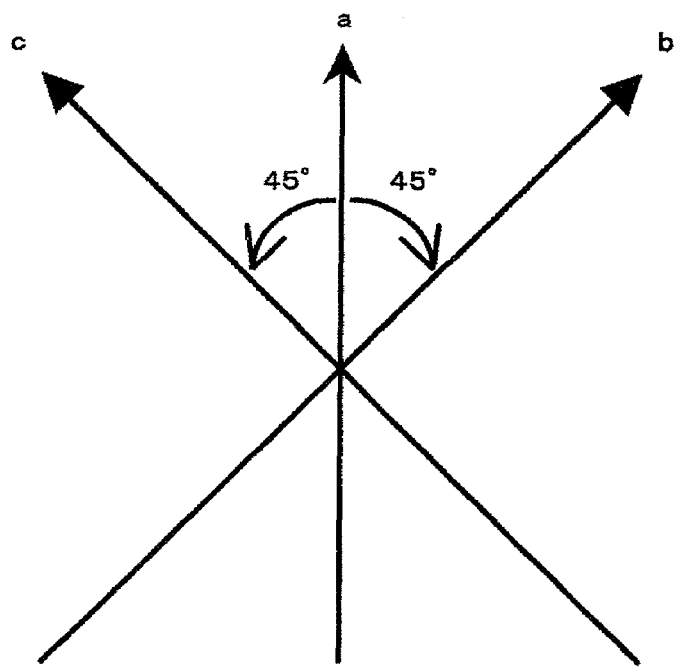
FIG. 6 is a diagram showing the relationship of an orientation control projection and absorption axes of polarization plates in the embodiment LCD panel.
Figure 9A:
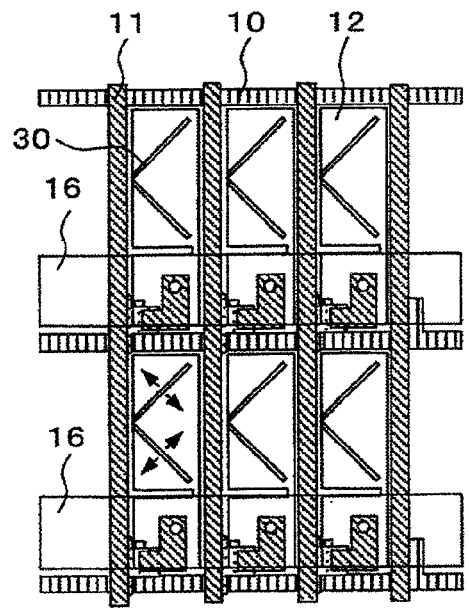
FIGS. 9A-9B are diagrams each showing a planar structure of an LCD cell array in accordance with another embodiment of this invention.
Figure 9B:
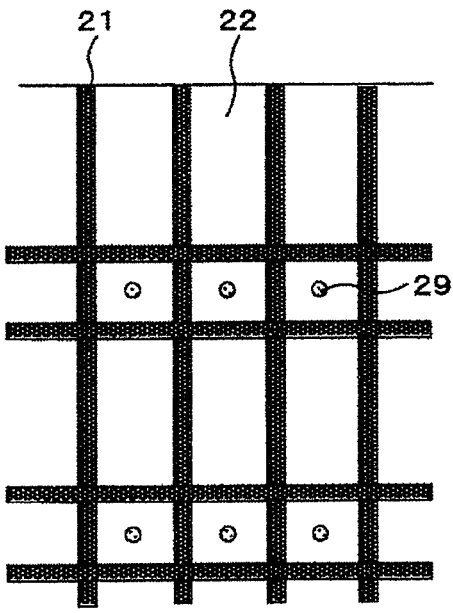

See FIG. 6, which shows the relationship of the absorption axes of upper and lower polarizer plates versus the long axis of the projection 29. The orientation control projection 29 in the transmission region of FIGS. 1A-1B and 2A-2B is formed to have its long axis extending in a direction shown in FIG. 6. In FIG. 6, reference character "a" designates the long axis of orientation control projection 29, "b" denotes a direction of the absorption axis of polarizer plate 32a, and "c" indicates a direction of the absorption axis of polarizer plate 32b, respectively.

In the case of the orientation control projection 29 being disposed, upon application of a voltage, vertically oriented LC molecules fall down in the direction at an angle of about ninety (90) degrees relative to a side edge of the orientation control projection 29. Accordingly, by disposing the orientation control projection 29 so that its long axis is angularly offset by 45 degrees with respect to the absorption axis of polarizer plate 32a, 32b as shown in FIG. 6, most LC molecules within a pixel behave to fall down while forming an angle of about 45 degrees relative to the absorption axis of polarizer plate 32a, 32b. In other words, a division number of LC orientation becomes two (2). As two directions along which LC molecules fall down are each controlled to form about 45 degrees, light transmission is allowed in almost entirety of the pixel area. Note that in FIG. 6, "b" and "c" are interchangeable with each other since what is required here is as follows: the absorption axes of polarizer plates 32a-32b intersect together at right angles, with the long axis of orientation control projection 29 forming the angle of about 45 degrees relative to the individual absorption axis.

Consequently, the mathematical formula $a=b+45=c-45=d$ or $a=b-45=c+45=d$ is established, where "a" is the axis of a direction along which major LC molecules fall down, "b" is the absorption axis of the polarizer plate 32a disposed on the backlight side, "c" is the absorption axis of polarizer plate 32b disposed on the light output side, and "d" is the slow axis of internal retardation plate 25.

With the arrangement above, it is possible to suppress or minimize the reduction of transmissivity in addition to the improvability of transmission contrast ratio.

Also importantly, it is no longer necessary that the LC molecule fall-down direction must form the angle of about 45 degrees with respect to the absorption axis of polarizer plate 32a, 32b because of the fact that the internal retardation plate 25 is disposed in the reflection region. Thus, in the reflection region, the projection 29 is formed in order to further increase the aperture ratio as shown in FIG. 1B. In FIG. 1B, the orientation control projection 29 is disposed between the common electrode 22 and its associated alignment film 17 in such a manner as to have an almost circular shape. Note here that similar results are also obtainable when a circle-shaped or round electrode opening is provided at either the pixel electrode 12 or the common electrode 22 in place of the orientation control projection 29.

In addition, the reflector plate electrode 16 is arranged to have a corrugated surface configuration in order to diffuse incoming outside light. Hence, the LC orientation may be controlled by this surface corrugation without having to dispose the orientation control projection 29 or the electrode opening in the reflection region.

It has been stated that appropriately altering the structure of orientation control projection 29 between the transmission region and the reflection region makes it possible to suppress transmissivity reduction to thereby realize the intended structure with increased aperture ratios.

Embodiment 3

An LCD device in accordance with another embodiment of this invention will next be described below.

This embodiment is drawn to a transreflective VA-LCD panel of the type letting LC molecules exhibit orientation in a vertical direction to a substrate surface in the absence of a voltage being applied thereto and causing the LC molecules to rotate in the horizontal direction relative to the substrate surface at the time a voltage is applied thereto, which device is characterized in that the retardation plate is disposed only at the reflection region while letting the main direction along which LC molecules of the transmission region be set to a direction of about 45 degrees with respect to each of the absorption axes of upper and lower polarizer plates. In doing so, the direction in which LC molecules fall down is determined and set by layout of an electrode slit(s). Another feature of the LCD panel is as follows: in the reflection part, the LC molecule fall-down direction may contain other angles except the about 45 degrees relative to each of the absorption axes of upper and lower polarizer plates, resulting in the transmission part and reflection part within a one pixel being different in division number from each other.

Although in this embodiment the retardation plate is not disposed in the transmission part, the transmission contrast ratio improvement is still attainable. This can be said because light leakage does not occur during black displaying due to the retardation plate while at the same time eliminating appreciable drop-down of transmissivity. Furthermore, owing to the structural design for letting the retardation plate be internally built in LC cell, it is possible to make the LCD panel thinner than prior art panels.

The LCD panel of this embodiment is similar in its sectional structure to that shown in FIG. 3, with the orientation control projection 29 disposed at the transmission part of Embodiment 1 being replaced by an electrode slit(s) which is defined in the pixel electrode 12 for performing control of LC molecule orientation.

Only modified points of this embodiment from Embodiment 1 will be explained using FIGS. 7A-7B and 8. FIGS. 7A-7B are diagrams each showing schematically a planar structure of an LC cell 33. FIG. 8 shows a sectional view taken along line D-D' of FIG. 7A.

While in Embodiment 1 the LC molecule fall-down direction is controlled by the orientation control projection 29, similar results are also obtainable by use of the electrode slit structure provided at the pixel electrode such as shown in FIG. 7A. In the case of the orientation control-use electrode slit 30 also, LC molecules fall down in the direction of about 90 degrees with respect to a side edge of the electrode slit. Thus, the resulting LC molecule division number becomes 2 at the transmission part shown in FIGS. 1A-1B in a similar way to the case of the orientation control projection 29. In other words, by disposing the electrode slit's long axis direction in a similar direction to the long axis direction of the orientation control projection 29 shown in FIG. 6, it is possible to obtain, even with the electrode slit structure also, similar effects to those when using the orientation control projection.

Also importantly, it is no longer necessary for the LC molecule fall-down direction to form the angle of about 45 degrees with respect to the absorption axis of polarizer plate 32a, 32b because of the fact that the internal retardation plate 25 is disposed in the reflection part in a similar way to Embodiment 1. Thus, it is desirable to employ the circle-shaped projection 29 such as shown in FIGS. 1A-1B in order to further enlarge the aperture ratio. Note here that almost similar results are obtainable when a circle-shaped electrode opening is provided at either the pixel electrode 12 or the common electrode 22 in place of the orientation control projection.

Additionally, the reflector plate electrode 16 is arranged to have a corrugated surface configuration in order to diffuse incoming outside light. Thus, the LC orientation may be controlled by this surface corrugation without having to dispose the orientation control projection 29 or the electrode opening in the reflection part.

With the above-stated arrangement, it is possible to improve the transmission contrast ratio of transreflective VA-LCD panel when compared to prior art panels while at the same time avoiding the risk of transmissivity reduction.

Embodiment 4

An LCD device in accordance with another embodiment of the invention will next be explained below.

This embodiment is a transreflective VA-LCD panel of the type aligning LC molecules in a vertical direction to a substrate surface in the absence of a voltage being applied thereto and causing the LC molecules to rotate in the horizontal direction relative to the substrate surface at the time a voltage is applied thereto, which panel is arranged to have a pixel structure wherein the retardation plate is disposed only at the reflection part, wherein the transmission part is four (4) in division number of LC molecule orientation, and wherein the fall-down direction of each LC molecule is set at about 45 degrees with respect to the absorption axis of polarizer plate. A feature of the LCD panel lies in that in the reflection part, the LC molecule fall-down direction may contain other angles except the about 45 degrees relative to each of the absorption axes of upper and lower polarizer plates, resulting in the transmission part and reflection part within a one pixel being different in division number from each other.

Although in this embodiment the retardation plate is not disposed in the transmission part, the transmission contrast ratio is improved significantly because of the fact that light leakage does not occur during black displaying due to the retardation plate while eliminating appreciable drop-down of transmissivity. Further, owing to the structural design for letting the retardation plate be internally built in LC cell, it is possible to make the LCD panel thinner than prior art panels. Furthermore, while in Embodiment 2 and Embodiment 3 the LC molecule orientation division number of transmission part is set at 2, this embodiment is such that the number becomes 4 whereby a viewing-angle compensation effect works well so that the view angle characteristics are also improved.

Figure 10A:
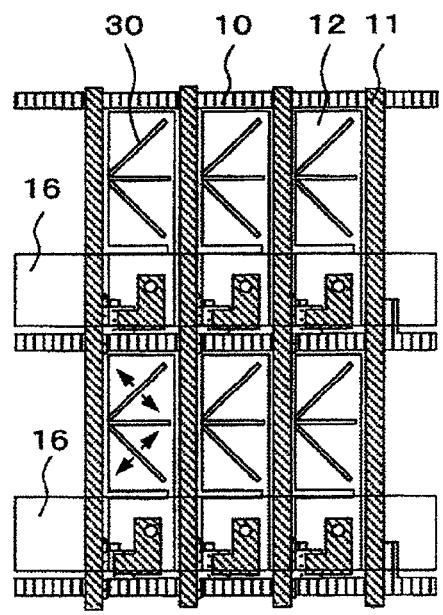
FIGS. 10A-10B are diagrams each showing a planar structure of an LCD cell array in accordance with another example of the embodiment shown in FIGS. 9A-9B.
Figure 10B:
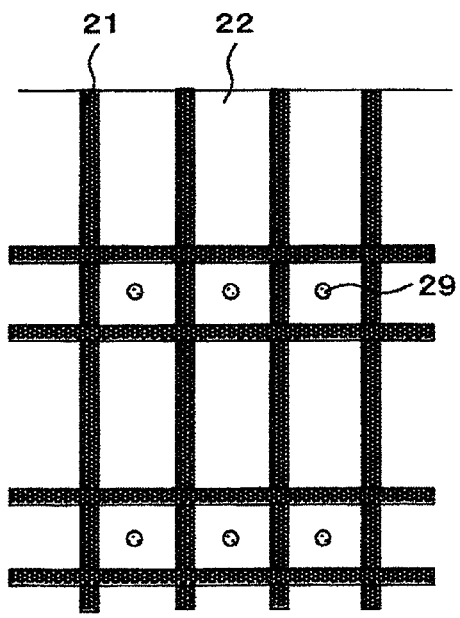

In order to set the transmission part's LC orientation division number at 4, it is needed to specifically design the orientation control projection 29 and/or the orientation control slit 30. Several exemplary pixel structures for setting to 4 the transmission part's LC orientation division number are shown in FIGS. 9A-9B through 15A-15B, wherein FIGS. 9A, 10A, . . . 15A depict planar views of TFT substrate whereas FIGS. 9B, 10B, . . . 15B are planar views of CF substrate. Four directional arrows indicated in TFT substrate shown in FIG. 9B, 10B, . . . 15B are main directions in which LC molecules fall down upon application of a voltage. From viewing each diagram also, it can be seen that the division number becomes 4.

Although in the pixel structure examples shown in FIGS. 9A-9B to 12A-12B the LC molecule fall-down direction is at an angle of 45 degrees from the pixel's long axis direction, the remaining pixel structure examples of FIGS. 13A-13B to 15A-15B are such that the LC molecule falldown direction is almost in parallel with or substantially perpendicular to the pixel's long axis direction. In the case of the former, it is desirable that the absorption axis of polarizer plate 32a, 32b be disposed in almost parallel with the pixel's elongate direction; in the case of the latter, it is desirable that the absorption axis of polarizer plate 32a, 32b be disposed at a location that was rotated by 45 degrees from the pixel elongate direction. Simultaneously, in the case of the former, it is desirable that the slow axis of the internal retardation plate 25 be disposed at a location rotated by 45 degrees from the pixel's elongate direction; in the case of the latter, the slow axis of the internal retardation plate 25 is made parallel with the pixel elongate direction.

Also importantly, it is unnecessary for the LC molecule fall-down direction to form the angle of about 45 degrees with respect to the absorption axis of polarizer plate 32a, 32b because the internal retardation plate 25 is disposed in the reflection part in a similar way to Embodiment 1. Thus it is desirable to employ the circular projection 29 such as shown in FIGS. 9A-9B to 12A-12B in order to further enlarge the aperture ratio. Note here that almost similar results are obtainable when a circle-shaped electrode opening is provided at either the pixel electrode 12 or the common electrode 22 in place of the orientation control projection.

In addition, the reflector plate electrode 16 is arranged to have a corrugated surface configuration in order to diffuse incoming outside light. Thus, the LC orientation may be controlled by this surface corrugation without having to dispose the orientation control projection 29 or the electrode opening in the reflection part.

With the above-stated arrangement, it is possible to improve the transmission contrast ratio of transreflective VA-LCD panel when compared to prior art panels while at the same time avoiding the risk of transmissivity reduction. An additional advantage of it lies in an ability to improve the view-angle characteristics owing to multi-domain effects resulting from an increase in LC orientation division number when compared to Embodiment 2 or 3 stated supra.

Embodiment 5

An LCD device in accordance with another embodiment of the invention will next be explained below.

A structural feature unique to this embodiment is that the reflection part is disposed at a central portion of each pixel while letting the LC orientation division number be set to 4 as in Embodiment 4. Using this arrangement makes it possible to reduce variations of main LC orientation direction at the transmission part to thereby improve the transmissivity.

Figure 11A:
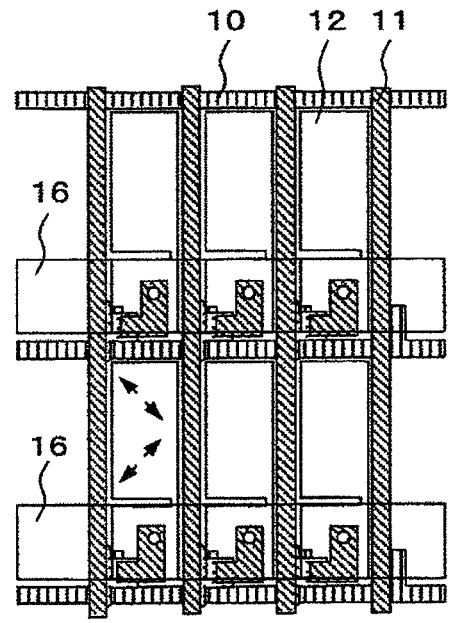
FIGS. 11A-11B are diagrams each showing a planar structure of an LCD cell array in accordance with still another example of the embodiment of FIGS. 9A-9B.
Figure 11B:
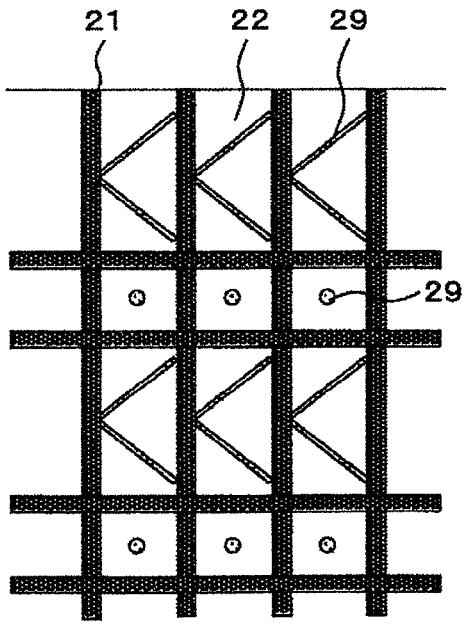
Figure 12A:
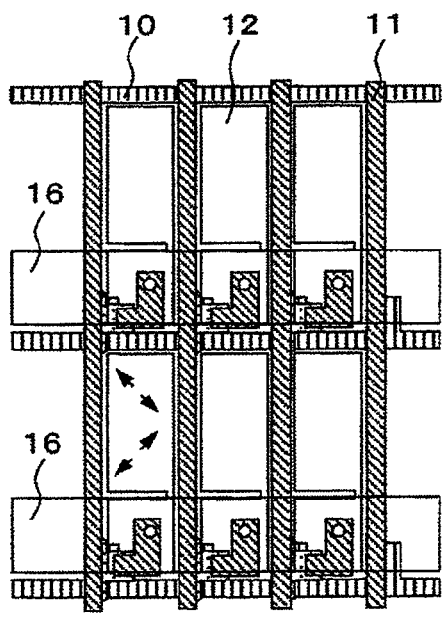
FIGS. 12A-12B are diagrams each showing a planar structure of an LCD cell array in accordance with yet another example of the embodiment of FIGS. 9A-9B.
Figure 12B:
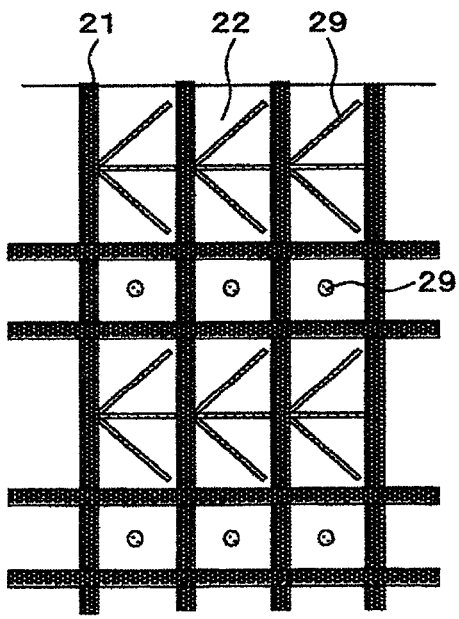
Figure 13A:
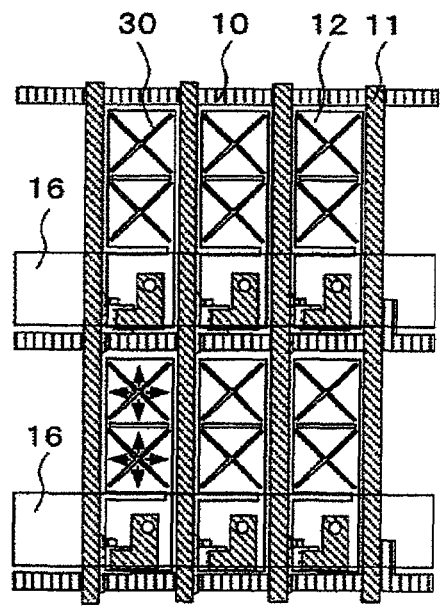
FIGS. 13A-13B are diagrams each showing a planar structure of an LCD cell array in accordance with a further example of the embodiment of FIGS. 9A-9B.
Figure 13B:
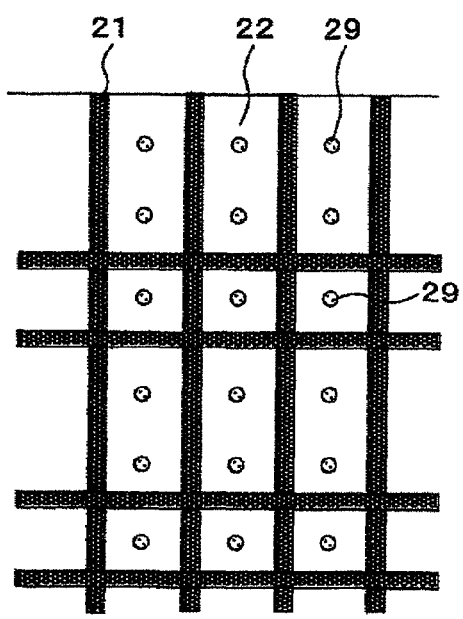
Figure 14A:
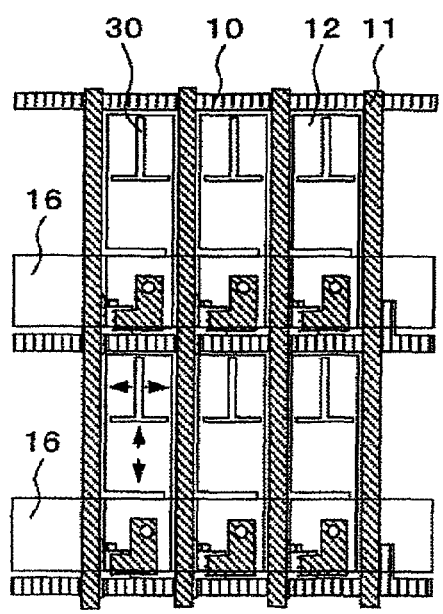
FIGS. 14A-14B are diagrams each showing a planar structure of an LCD cell array in accordance with another further example of the embodiment of FIGS. 9A-9B.
Figure 14B:
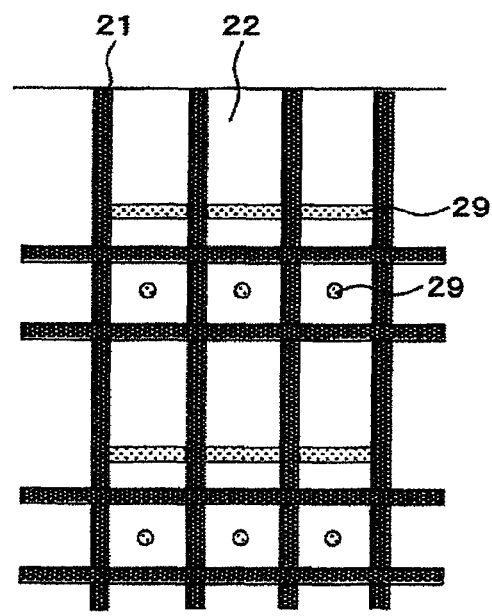
Figure 15A:
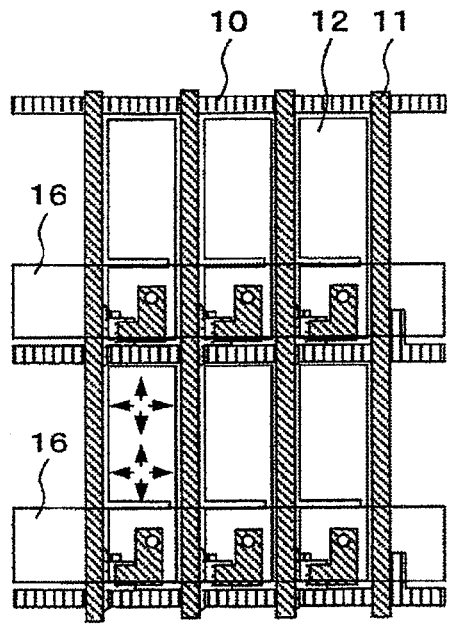
FIGS. 15A-15B are diagrams each showing a planar structure of an LCD cell array in accordance with still another further example of the embodiment of FIGS. 9A-9B.
Figure 15B:
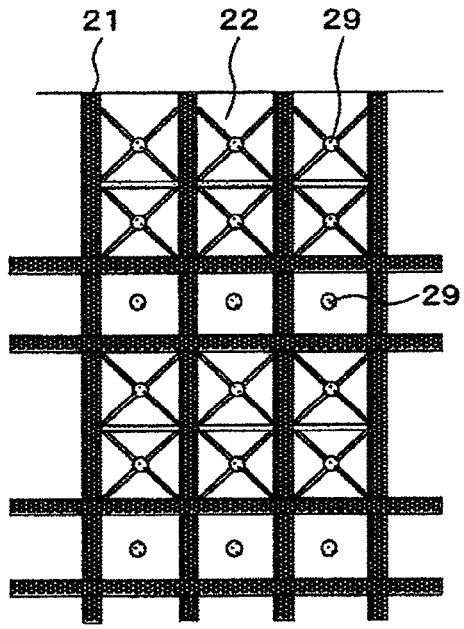
Figure 16A:
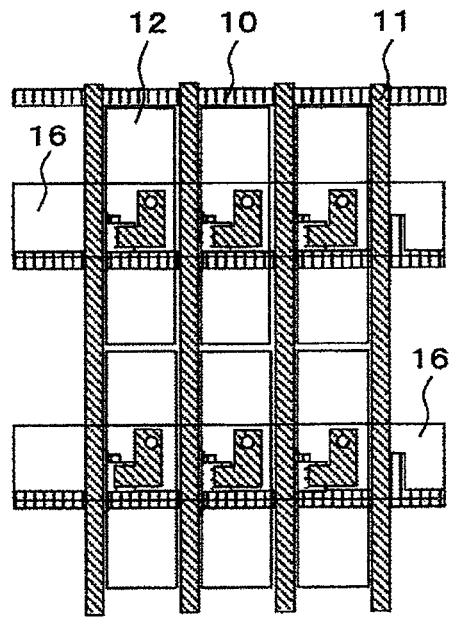
FIGS. 16A-16B are diagrams each showing a planar structure of an LCD cell array in accordance with a further embodiment of this invention.
Figure 16B:
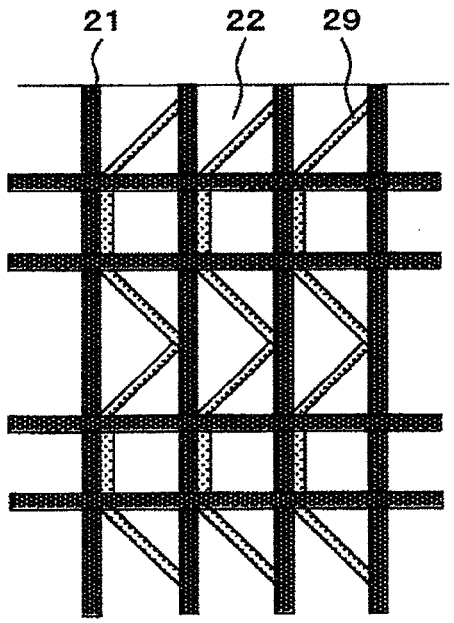

This embodiment will be described in detail with reference to FIGS. 16A and 16B. FIGS. 16A-B are diagrams each showing schematically a planar structure of LC cell 33. Unlike the other embodiments with the reflection region being provided at lower part of a single pixel, this embodiment is such that the reflection region is provided at the center of such pixel. More specifically, in the case of using the pixel structure shown in FIGS. 11A-11B of Embodiment 4 for example, the orientation control projection 29 of transmission part that is disposed on the second substrate 23 side is specifically designed to have a curved or bent shape. Desirably its bending angle is set to about 45 degrees. In the case of this bent shape, most LC molecules of the transmission part are aligned in four divided directions of LC orientation. However, at or near those portions with the transmission part's orientation control projection 29 being bent at right angles, LC molecules are oriented in a direction perpendicular to the pixel's long axis direction. This would result in observation as a block domain(s) during on-screen image displaying. To avoid this problem, as shown in FIGS. 16A-16B, let LC orientation disturbance-occurrable portions be the reflective pixels, wherein the orientation disturbance includes unwanted orientation of LC molecules in the direction perpendicular to the pixel's long axis direction. As the internal retardation plate 25 is disposed at the reflection part, light transmits even when LC molecules fall down in all possible angular directions. This ensures that the transmission part has the identical LC orientation direction in almost every region thereof. Thus it is possible to realize high transmissivity.

With the arrangement above, it is possible to improve the transmissivity while achieving wide view angles as has been indicated in Embodiment 3.

Embodiment 6

An LCD device in accordance with another embodiment of the invention will next be explained below.

A structural feature of this embodiment is that the reflection part is disposed at a central portion of each pixel while letting the LC orientation division number be set to 4 as in Embodiment 4. Using this arrangement makes it possible to reduce variations of main LC orientation direction at the transmission part to thereby improve the transmissivity.

This embodiment will be discussed using FIGS. 17A and 17B. FIGS. 17A-17B are diagrams each showing a schematical planar structure of LC cell 33. Whereas each prior known pixel has an almost rectangular shape, the pixel of this embodiment is arranged to have a "V"-like curved/bent shape, resulting in a zigzag pattern on the whole. Desirably the bending angle is set at about 45 degrees. Signal transfer lines 11, black matrix 21 and orientation control projection 29 are also disposed in a similar bent form. With this zigzag layout design, the division number of LC orientation becomes four (4), resulting in the LC orientation upon voltage application at each divided area is aligned with the main LC orientation direction more successfully. This leads to more appreciable improvement in transmissivity.

With the arrangement above, it is possible to much improve the transmissivity while at the same time achieving a wide viewing angle as has been indicated in Embodiment 3 stated supra.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:
1. A liquid crystal display comprising:
a pair of spaced-part first and second substrates;
a liquid crystal layer interposed between the first and second substrates;
a first polarization plate provided at the first substrate; and
a second polarization plate provided at the second substrate
wherein the first and second polarization plates have absorption axes which are disposed to cross together at substantially right angles to each other;
wherein upon application of no voltage, the liquid crystal layer exhibits orientation so that long axes of liquid crystal molecules are substantially perpendicular to the first and second substrates;
wherein a plurality of picture elements are formed between the first and second substrates, each of the picture elements having a reflection part and a transmission part;
wherein the liquid crystal layer is variable in thickness so that a layer portion being disposed at the transmission part is thicker than a layer portion disposed at the reflection part;
wherein at the reflection part, an internal retardation plate having an optical phase difference is disposed between the second substrate and the liquid crystal layer;
wherein the internal retardation plate has a phase delay axis forming an angle of substantially forty five (45) degrees with each of the absorption axes of the first and second polarization plates;

wherein the internal retardation plate has a retardation of a quarter (1/4) wavelength;

wherein a mechanism for controlling orientation of the liquid crystal layer at the transmission part is different from a mechanism for controlling orientation of the liquid crystal layer at the reflection part;

wherein the liquid crystal layer is such that a division number of orientation control at the transmission part is different from a division number of orientation control at the reflection part; and wherein an orientation direction of liquid crystal molecules upon voltage application in the liquid crystal layer is at an angle of about forty five (45) degrees with each of the absorption axes of the first and second polarization plates at the transmission part, and the orientation direction of the liquid crystal molecules upon voltage application in the liquid crystal layer at the reflection part includes angles other than about 45 degrees.

2. A liquid crystal display according to claim 1, wherein the first substrate has a pixel electrode on a liquid crystal layer side and has the first polarization plate on an opposite side to the liquid crystal layer, wherein the second substrate has a common electrode on the liquid crystal layer side and the second polarization plate on the opposite side to the liquid crystal layer, and wherein the internal retardation plate is disposed between the second substrate and the common electrode.

3. A liquid crystal display according to claim 1, wherein liquid crystal molecules of the liquid crystal layer are negative in anisotropy of dielectric constant.

4. A liquid crystal display according to claim 1, wherein the mechanism for control of orientation of the liquid crystal layer at the transmission part is any one of a projection and an electrode slit.

5. A liquid crystal display according to claim 4, wherein any one of the projection and the electrode slit has a long axis extending to form an angle of about 45 degrees with each of the absorption axes of the first and second polarization plates.

6. A liquid crystal display according to claim 1, wherein the mechanism for controlling orientation of the liquid crystal layer at the reflection part is any one of a projection and an electrode opening.

7. A liquid crystal display according to claim 6, wherein any one of the projection and the electrode opening is substantially circular in shape.

8. A liquid crystal display according to claim 1, wherein a convexo-concave configuration is disposed at the reflection part on a liquid crystal layer side of the first substrate, and wherein the mechanism for controlling orientation of the reflection part is done by the convexo-concave configuration.

9. A liquid crystal display according to claim 1, wherein the division number of orientation control at the transmission part is any one of two (2) and four (4), which is different from the division number of orientation control at the reflection part.

10. A liquid crystal display according to claim 1, wherein the transmission part is formed to be divided into a first transmission part and a second transmission part with the reflection part being placed therebetween, and wherein an orientation direction of liquid crystal molecules upon voltage application in the liquid crystal layer is different at the first transmission part and at second transmission part.

11. A liquid crystal display according to claim 10, wherein the transmission part and the reflection part are each arranged to have any one of a projection and an electrode slit for orientation control, wherein any one of the projection and the electrode slit has a bent portion, and wherein the bent portion is disposed either at the reflection part or between adjacent ones of the plurality of pixels.

12. A liquid crystal display according to claim 10, wherein each of the pixels has a folded shape.

13. A liquid crystal display according to claim 1, further comprising at least one of a first retardation plate between the first substrate and the first polarization plate and a second retardation plate between the second substrate and the second polarization plate, wherein the first retardation plate has its phase delay axis being disposed substantially perpendicular to or in parallel with the absorption axis of the first polarization plate, and wherein the second retardation plate has its phase delay axis being disposed substantially perpendicular to or in parallel with the absorption axis of the second polarization plate.

14. A liquid crystal display according to claim 13, wherein each of the first retardation plate and the second retardation plate is a negative C-plate.

15. A liquid crystal display according to claim 14, wherein the negative C-plate is more than or equal to 50 nanometers (nm) and yet less than 150 nm in Rth, where Rth is out-of-plane retardation.

16. A liquid crystal display according to claim 13, wherein the first retardation plate and the second retardation plate are each made up of a negative C-plate and a biaxial retardation film.

17. A liquid crystal display according to claim 16, wherein the negative C-plate is more than or equal to 50 nm and yet less than 150 nm in Rth.

18. A liquid crystal display according to claim 16, wherein the biaxial retardation film is more than or equal to 0.2 and less than 0.8 in Nz coefficient thereof.

19. A liquid crystal display according to claim 4, wherein the reflection part is provided at a center area of the picture element, and wherein at least one of the projection and the electrode slit has at least one of a curved shape and a bent shape.

20. A liquid crystal display according to claim 4, wherein the reflection part is provided at a center area of the picture element, and wherein at least one of the picture element, the projection and the electrode slit has at least one of a curved shape and a bent shape.

* * * * *